(12) United States Patent
Kim et al.

(10) Patent No.: US 11,302,946 B2
(45) Date of Patent: Apr. 12, 2022

(54) MANUFACTURING METHOD FOR MEMBRANE ELECTRODE ASSEMBLY, AND STACKED BODY

(71) Applicant: LG CHEM, LTD., Seoul (KR)

(72) Inventors: Ji Hun Kim, Daejeon (KR); Doyoung Kim, Daejeon (KR); Jae Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 85 days.

(21) Appl. No.: 16/645,805

(22) PCT Filed: Jan. 15, 2019

(86) PCT No.: PCT/KR2019/000585
§ 371 (c)(1),
(2) Date: Mar. 10, 2020

(87) PCT Pub. No.: WO2019/143097
PCT Pub. Date: Jul. 25, 2019

(65) Prior Publication Data
US 2020/0274180 A1    Aug. 27, 2020

(30) Foreign Application Priority Data

Jan. 19, 2018 (KR) .................. 10-2018-0007161

(51) Int. Cl.
*H01M 8/1004* (2016.01)
*H01M 4/86* (2006.01)
*H01M 4/88* (2006.01)
*H01M 8/1053* (2016.01)

(52) U.S. Cl.
CPC ....... *H01M 8/1004* (2013.01); *H01M 4/8657* (2013.01); *H01M 4/881* (2013.01); *H01M 8/1053* (2013.01)

(58) Field of Classification Search
None
See application file for complete search history.

(56) References Cited

U.S. PATENT DOCUMENTS

2002/0136940 A1    9/2002  Mao et al.
2006/0083971 A1    4/2006  Desimone et al.
2007/0122684 A1    5/2007  Song
(Continued)

FOREIGN PATENT DOCUMENTS

EP        1843425 A1     10/2007
JP        2004039474 A    2/2004
JP        2006049169      2/2006
(Continued)

OTHER PUBLICATIONS

International Search Report corresponding to PCT/KR2019/000585, dated Apr. 19, 2019 (5 pages including English translation).

*Primary Examiner* — Daniel S Gatewood
(74) *Attorney, Agent, or Firm* — Myers Bigel, P.A.

(57) ABSTRACT

The present specification relates to a method for manufacturing a membrane electrode assembly and a laminate. Specifically, the present specification relates to a method for manufacturing a membrane electrode assembly including an anode, a cathode, and an electrolyte membrane provided between the anode and the cathode, and a laminate which is an intermediate laminated during the manufacture of the membrane electrode assembly.

20 Claims, 9 Drawing Sheets

(56) References Cited

U.S. PATENT DOCUMENTS

2007/0231648 A1   10/2007   Han et al.
2017/0237103 A1   8/2017   Choi et al.

FOREIGN PATENT DOCUMENTS

| JP | 2006331720 | | 12/2006 |
| JP | 2006331720 A | * | 12/2006 |
| JP | 2007265733 | | 10/2007 |
| JP | 2007265733 A | * | 10/2007 |
| JP | 2013201140 | | 10/2013 |
| KR | 1020070055225 | | 5/2007 |
| KR | 1020070099278 | | 10/2007 |
| KR | 1020080013533 A | | 2/2008 |
| KR | 1020080044495 | | 5/2008 |
| KR | 1020090027527 | | 3/2009 |
| KR | 1020160059419 | | 5/2016 |

* cited by examiner

MANUFACTURING METHOD FOR MEMBRANE ELECTRODE ASSEMBLY, AND STACKED BODY

CROSS REFERENCE TO RELATED APPLICATIONS

This application is a 35 U.S.C. § 371 national stage application of PCT International Application No. PCT/KR2019/000585, filed Jan. 15, 2019, which claims priority from Korean Patent Application No. 10-2018-0007161, filed Jan. 19, 2018, the contents of which are incorporated herein in their entireties by reference. The above-referenced PCT International Application was published in the Korean language as International Publication No. WO 2019/143097 on Jul. 25, 2019.

TECHNICAL FIELD

The present specification relates to a method for manufacturing a membrane electrode assembly and a laminate. Specifically, the present specification relates to a method for manufacturing a membrane electrode assembly including an anode, a cathode, and an electrolyte membrane provided between the anode and the cathode, and a laminate which is an intermediate laminated during the manufacture of the membrane electrode assembly.

BACKGROUND ART

Recently, as the depletion of existing energy resources such as petroleum or coal is expected, the need for energy capable of replacing these energy resources has been increasing, and as one of the alternative energies, interests in a fuel cell, a metal secondary cell, a flow battery, and the like has been focused.

As one of these alternative energies, a fuel cell has been actively studied because the fuel cell is highly efficient and does not discharge pollutants such as $NO_x$ and $SO_x$, and the fuel used is abundant.

Figure 1:
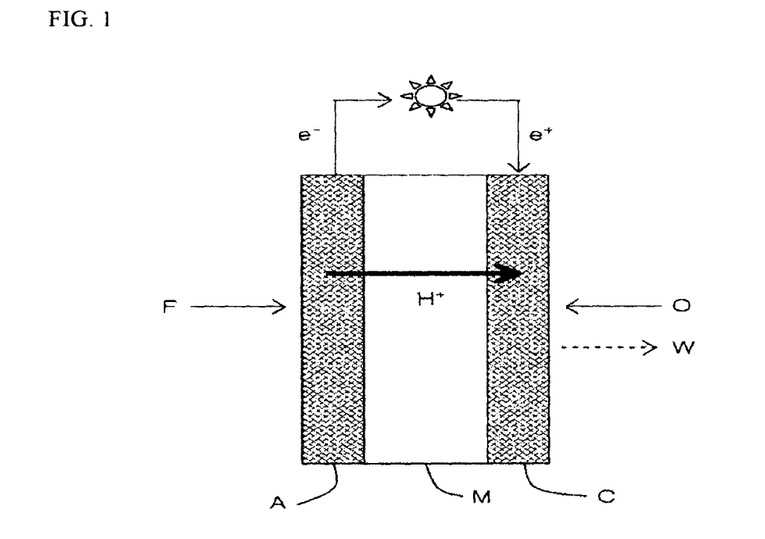
FIG. 1 is a schematic view illustrating an electricity generation principle of a fuel cell.

FIG. 1 schematically illustrates an electricity generation principle of a fuel cell, and in a fuel cell, the most fundamental unit of generating electricity is a membrane electrode assembly (MEA), and the membrane electrode assembly is composed of an electrolyte membrane (M), and an anode (A) and a cathode (C) formed on both surfaces of the electrolyte membrane (M). Referring to FIG. 1 which illustrates an elasticity generation principle of a fuel cell, an oxidation reaction of fuel (F) such as hydrogen or a hydrocarbon such as methanol and butane occurs in the anode (A), and as a result, hydrogen ions ($H^+$) and electrons ($e^-$) are generated, and the hydrogen ions move to the cathode (C) through the electrolyte membrane (M). In the cathode (C), the hydrogen ions transferred through the electrolyte membrane (M), an oxidizing agent (O) such as oxygen, and electrons react to produce water (W). Electrons move to an external circuit by the reaction.

DETAILED DESCRIPTION OF INVENTION

Technical Problem

The present specification has been made in an effort to provide a method for manufacturing a membrane electrode assembly and a laminate. Specifically, the present specification has been made in an effort to provide a method for manufacturing a membrane electrode assembly including an anode, a cathode, and an electrolyte membrane provided between the anode and the cathode, and a laminate which is an intermediate laminated during the manufacture of the membrane electrode assembly.

Technical Solution

The present specification provides a method for manufacturing a membrane electrode assembly, the method including: manufacturing a first electrode film by forming a first electrode catalyst layer on a first release film; manufacturing a second electrode film by forming a second electrode catalyst layer on a second release film; preparing an electrolyte membrane; disposing the first electrode film and the second electrode film on both surfaces of the electrolyte membrane, such that surfaces on which the first electrode catalyst layer and the second electrode catalyst layer are formed each face the electrolyte membrane; forming a laminate by additionally disposing pattern paper having non-thermal conductivity on a surface opposite to a surface of the first release film on which the first electrode catalyst layer is formed; after disposing the laminate between two transfer substrates having non-thermal conductivity, heat-bonding the laminate with pressure between the two transfer substrates; and forming an assembly by removing the pattern paper, the first release film, and the second release film from the heat-bonded laminate.

Further, the present specification provides a laminate including: a first electrode film including a first release film and a first electrode catalyst layer provided on the first release film; a second electrode film including a second release film and a second electrode catalyst layer provided on the second release film; an electrolyte membrane provided between the first electrode film and the second electrode film; and pattern paper having non-thermal conductivity provided on the first release film, in which surfaces on which the first electrode catalyst layer and the second electrode catalyst layer are formed are provided so as to each face the electrolyte membrane, and the pattern paper is provided on a surface opposite to a surface of the first release film on which the first electrode catalyst layer is formed.

Advantageous Effects

According to a method according to an exemplary embodiment of the present specification, a pattern may be formed on an electrode and an electrolyte membrane to improve the interface bonding between the electrode and the electrolyte membrane.

According to a method according to an exemplary embodiment of the present specification, a pattern may be formed on an electrode and an electrolyte membrane to increase the contact area between the electrode and the electrolyte membrane, thereby improving the performance.

10$a$: Buffer substrate
11$a$: Flat substrate
20$a$: Pattern paper
30$a$: Electrode film
31$a$: Electrode catalyst layer
32$a$: Release film
40$a$, 100: Electrolyte membrane
60: Stack
70$a$: Transfer substrate
70: Oxidizing agent supplying part
80: Fuel supplying part
81: Fuel tank
82: Pump
200: Cathode catalyst layer
210: Anode catalyst layer
400: Cathode gas diffusion layer
410: Anode gas diffusion layer
500: Cathode
510: Anode

BEST MODE

Hereinafter, the present specification described in detail.

[Method for Manufacturing Membrane Electrode Assembly]

The present specification provides a method for manufacturing a membrane electrode assembly, the method including:

manufacturing a first electrode film by forming a first electrode catalyst layer on a first release film;

manufacturing a second electrode film by forming a second electrode catalyst layer on a second release film;

preparing an electrolyte membrane;

disposing the first electrode film and the second electrode film on both surfaces of the electrolyte membrane, such that surfaces on which the first electrode catalyst layer and the second electrode catalyst layer are formed each face the electrolyte membrane;

forming a laminate by additionally disposing pattern paper having non-thermal conductivity on a surface opposite to a surface of the first release film on which the first electrode catalyst layer is formed;

after disposing the laminate between two transfer substrates having thermal conductivity, heat-bonding the laminate with pressure between the two transfer substrates; and forming an assembly by removing the pattern paper, the first release film, and the second release film from the heat-bonded laminate.

[Manufacture of First and Second Electrode Films]

The method for manufacturing a membrane electrode assembly according to the present specification includes: manufacturing a first electrode film by forming a first electrode catalyst layer on a first release film; and manufacturing a second electrode film by forming a second electrode catalyst layer on a second release film.

A material for the first and second release films is not particularly limited as long as the material may support an electrode catalyst layer to be formed on a base material and has a good release property during the transfer to an electrolyte membrane, but a typical release film used in the art may be adopted.

The first and second electrode catalyst layers may be each formed by using an electrode composition, a method of forming the first and second electrode catalyst layers may be performed by a typical method known in the art, and for example, it is possible to use a method such as spray coating, tape casting, screen printing, blade coating, comma coating, or die coating.

The electrode composition may be variously applied according to the type and use of electrode catalyst layer, and the electrode composition may include a catalyst, a polymer ionomer, and a solvent.

The type of catalyst is not particularly limited, and a catalyst used in the art may be adopted. For example, the catalyst may include a metal particle selected from the group consisting of platinum, ruthenium, osmium, a platinum-ruthenium alloy, a platinum-osmium alloy, a platinum-palladium alloy, and a platinum-transition metal alloy. In this case, the metal particle may be a solid particle, a hollow metal particle, a bowl-type particle, a core-shell particle, or the like.

The catalysts may be not only used as they are, but also used while being supported on a carbon-based carrier.

As the carbon-based carrier, any one selected from the group consisting of graphite, carbon black, acetylene black, Denka black, Ketjen black, activated carbon, mesoporous carbon, carbon nanotube, carbon nano fiber, carbon nano horn, carbon nano ring, carbon nano wire, fullerene (C60), and Super P black, or a mixture of two or more thereof may be a preferred example as a carbon-based material.

As the polymer ionomer, a Nafion ionomer or a sulfonated polymer such as sulfonated polytrifluorostyrene may be representatively used.

The solvent is not particularly limited, and a solvent used in the art may be adopted. For example, as the solvent, any one selected from the group consisting of water, butanol, isopropanol, methanol, ethanol, n-propanol, n-butyl acetate, glycerol, and ethylene glycol, or a mixture of two or more thereof may be preferably used.

[Preparation of Electrolyte Membrane]

The method for manufacturing a membrane electrode assembly according to the present specification may include preparing an electrolyte membrane.

In the preparing of the electrolyte membrane, an electrolyte membrane manufactured outside may be purchased or an electrolyte membrane may be directly manufactured.

The electrolyte membrane may be a reinforced membrane which includes a polymer including an ion conductive polymer, and is manufactured by impregnating the ion conductive polymer in pores of a porous support, or a pure membrane which is manufactured by curing an ion conductive polymer without a porous support.

The porous support is not particularly limited in type, but may be a material derived from a polyolefin-based material such as polypropylene (PP) and polyethylene (PE) and a fluorocarbon such as polytetrafluoroethylene (PTFE), or a blend thereof. Further, it is preferred that the porous support has a property of a porosity of 60 to 90% and a permeability (time for 500 cc of the air to pass through the porous support) of 15 to 30 seconds.

The ion conductive polymer is not particularly limited as long as the polymer is a material that can exchange ions, and those generally used in the art may be used.

The ion conductive polymer may be a hydrocarbon-based polymer, a partially fluorine-based polymer, or a fluorine-based polymer.

The hydrocarbon-based polymer may be a hydrocarbon-based sulfonated polymer having no fluorine group, and in contrast, the fluorine-based polymer may be a sulfonated polymer which is saturated with a fluorine group, and the partially fluorine-based polymer may be a sulfonated polymer which is not saturated with a fluorine group.

The ion conductive polymer may be one or two or more polymers selected from the group consisting of a perfluorosulfonic acid-based polymer, a hydrocarbon-based polymer, an aromatic sulfone-based polymer, an aromatic ketone-based polymer, a polybenzimidazole-based polymer, a polystyrene-based polymer, a polyester-based polymer, a polyimide-based polymer, a polyvinylidene fluoride-based polymer, a polyethersulfone-based polymer, a polyphenylene sulfide-based polymer, a polyphenylene oxide-based polymer, a polyphosphazene-based polymer, a polyethylene naphthalate-based polymer, a polyester-based polymer, a doped polybenzimidazole-based polymer, a polyether ketone-based polymer, a polyetheretherketone-based polymer, a polyphenylquinoxaline-based polymer, a polysulfone-based polymer, a polypyrrole-based polymer, and a polyaniline-based polymer. The polymer may be sulfonated and used, and may be a single copolymer, an alternating copolymer, a random copolymer, a block copolymer, a multi-block copolymer, or a graft copolymer, but is not limited thereto.

The ion conductive polymer may be a polymer having cation conductivity, and may include at least one of, for example, a perfluorosulfonic acid-based polymer, sulfonated polyetheretherketone (sPEEK), sulfonated polyetherketone (sPEK), poly(vinylidene fluoride)-graft-poly(styrene sulfonic acid (PVDF-g-PSSA), and sulfonated poly(fluorenyl ether ketone).

[Disposition of First and Second Electrode Films]

The method for manufacturing a membrane electrode assembly according to the present specification may include disposing the first electrode film and the second electrode film on both surfaces of the electrolyte membrane. In this case, it is preferred that surfaces on which the first electrode catalyst layer and the second electrode catalyst layer are formed are disposed so as to each face the electrolyte membrane.

[Formation of Laminate]

Figure 4:
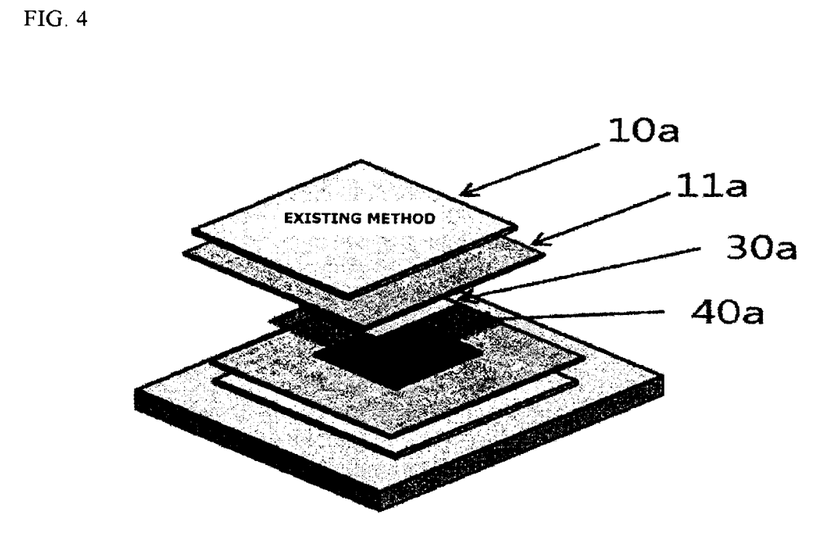
FIG. 4 is a view schematically illustrating a laminate of a membrane electrode assembly in the related art.

The related art did not have a separate means that imparts a pattern to a laminate during the manufacture of a membrane electrode assembly, as illustrated in FIG. 4.

Figure 5:
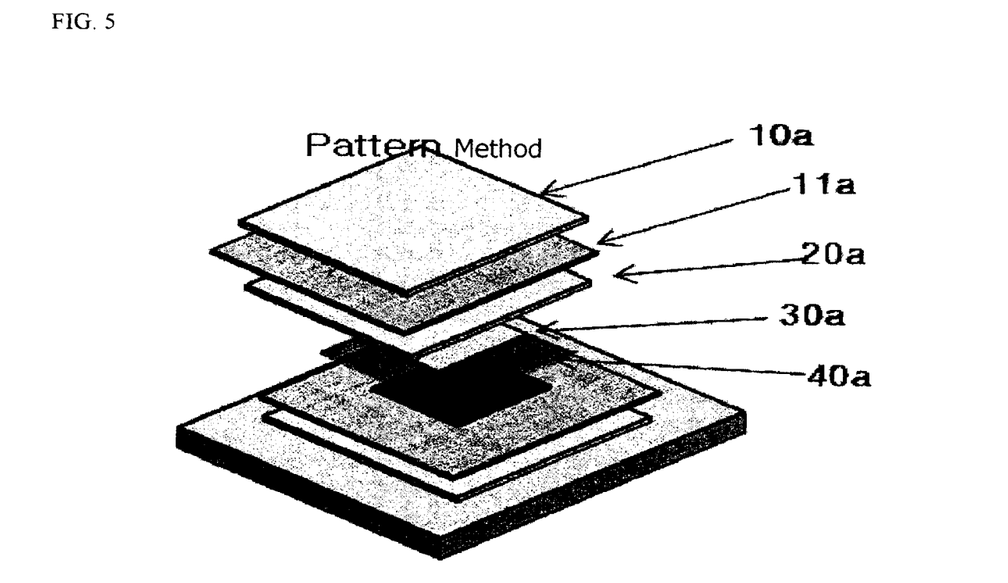
FIG. 5 is a view schematically illustrating a pattern production method of a membrane electrode assembly according to the present specification.

The method for manufacturing a membrane electrode assembly according to the present specification may include forming a laminate by additionally disposing pattern paper having non-thermal conductivity on a surface opposite to a surface of the first release film on which the first electrode catalyst layer is formed. FIG. 5 illustrates a structure of a laminate in which pattern paper is additionally included.

In the forming of the laminate, it is possible to impart a pattern to the laminate through a simple process by additionally disposing the pattern paper before heat-bonding the laminate.

In the forming of the laminate, when the electrode catalyst layers are heat-bonded onto both surfaces of the electrolyte membrane, by inserting thin pattern paper only onto the electrode catalyst layer at one side, a pattern depending on the pattern paper may be formed not only on the electrode catalyst layer at the one side where the pattern paper is laminated, but also on the electrode catalyst layer at the other side where the pattern paper is not laminated.

The laminate to which the pattern is imparted through the pattern paper has an advantage in that the interface bonding with an adjacent layer is improved. Specifically, the laminate has an advantage in that bonding at an interface between the first electrode catalyst layer and the electrolyte membrane and bonding at an interface between the second electrode catalyst layer and the electrolyte membrane are all improved.

The laminate to which the pattern is imparted through the pattern paper has an advantage in that the contact area with an adjacent layer is increased. Specifically, the laminate has an advantage in that a contact area at an interface between the first electrode catalyst layer and the electrolyte membrane and a contact area at an interface between the second electrode catalyst layer and the electrolyte membrane are all increased.

[Pattern Paper]

The thickness of the pattern paper is not particularly limited as long as the thickness does not hinder heat for heat-bonding from being transferred from the transfer substrate to the electrode catalyst layer and the electrolyte membrane, and may be 10 μm or more and 1 mm or less, specifically 200 μm or more and 800 μm or less, and preferably 400 μm or more and 700 μm or less.

According to an exemplary embodiment of the present specification, the pattern paper may include a base material and a pattern provided on the base material.

The base material is not particularly limited as long as the base material has non-thermal conductivity, but may be, for example, a cloth, a non-woven fabric, a plastic film, or paper.

The pattern may include an opening of a closed figure and a pattern line surrounding the opening.

A composition for forming the pattern line is a material which is the same as the base material, or includes a polymer, and in the case of a polymer, the content of the polymer may be 1% to 50% based on the total weight of the composition.

A method of forming the pattern line on a base material is not particularly limited, but the pattern line may be formed by roll printing, an inkjet method, a woven pattern (cloth), and the like.

The line width of the pattern line is not particularly limited, but may be 100 nm or more and 1 mm or less, 1 μm or more and 500 μm or less, and 10 μm or more and 200 μm or less.

The pattern line may be a continuous pattern line or a non-continuous pattern line, and may be a linear shape, a curved line, a zigzag, or the like. Preferably, the pattern line may be a continuous linear pattern.

The pattern may be a regular pattern, an irregular pattern, or a mixed pattern thereof, and may be preferably a regular pattern. For example, the pattern may be a mesh pattern.

The pattern may further include a protrusion in the opening. A cross section of the protrusion may be a circular or polygonal shape, and a size of the protrusion may be 50 nm or more and 200 μm or less. In this case, the size of the protrusion refers to a distance between the longest two points on the cross section.

According to another exemplary embodiment of the present specification, the pattern paper may be composed of an opening in which a continuous pattern is left in a base material and the remaining portion is cut away.

According to still another exemplary embodiment of the present specification, the pattern paper may be preferably a cloth with a woven pattern, and may be specifically a polyester cloth with a woven pattern. In this case, the line width and form of the pattern are the same as the definitions of the above-described pattern.

The pattern may be a regular pattern, an irregular pattern, or a mixed pattern thereof, and may be preferably a regular pattern. For example, the pattern may be a mesh pattern.

The interval of the pattern is not particularly limited, but may be 50 μm or more and 3 mm or less, 500 μm or more and 1.5 mm or less, and 800 μm or more and 1 mm or less.

[Heat-Bonding Step]

The method for manufacturing a membrane electrode assembly according to the present specification may include heat-bonding the laminate. Specifically, the heat-bonding of the laminate may be disposing the laminate between two transfer substrates having heat conductivity, and then heat-bonding the laminate with pressure between the two transfer substrates.

In the heat-bonding of the laminate, a flat substrate and a buffer substrate may be additionally included between the two transfer substrates. Specifically, it is possible to have a structure of a transfer substrate/a buffer substrate/a flat substrate/a laminate/a flat substrate/a buffer substrate/a transfer substrate.

The transfer substrate may be a metal substrate having heat conductivity, and the material thereof is not particularly limited, but may be aluminum, stainless steel, a titanium alloy, or the like.

The transfer substrate is a component provided in a heat-bonding device, and a laminate to be heat-bonded is provided and inserted between the transfer substrates provided in the heat-bonding device, and then the heat-bonding device is driven to apply pressure to the inserted laminate while narrowing the gap between the two transfer substrates.

The temperature of the transfer substrate is not particularly limited as long as the first and second electrode catalyst layers may be bonded onto the electrolyte membrane, but may be, for example, 100° C. or more and 150° C. or less.

The pressure of the transfer substrate is not particularly limited as long as the first and second electrode catalyst layers may be bonded onto the electrolyte membrane, but may be, for example, 0.5 ton or more and 3.0 ton or less.

Figure 6:
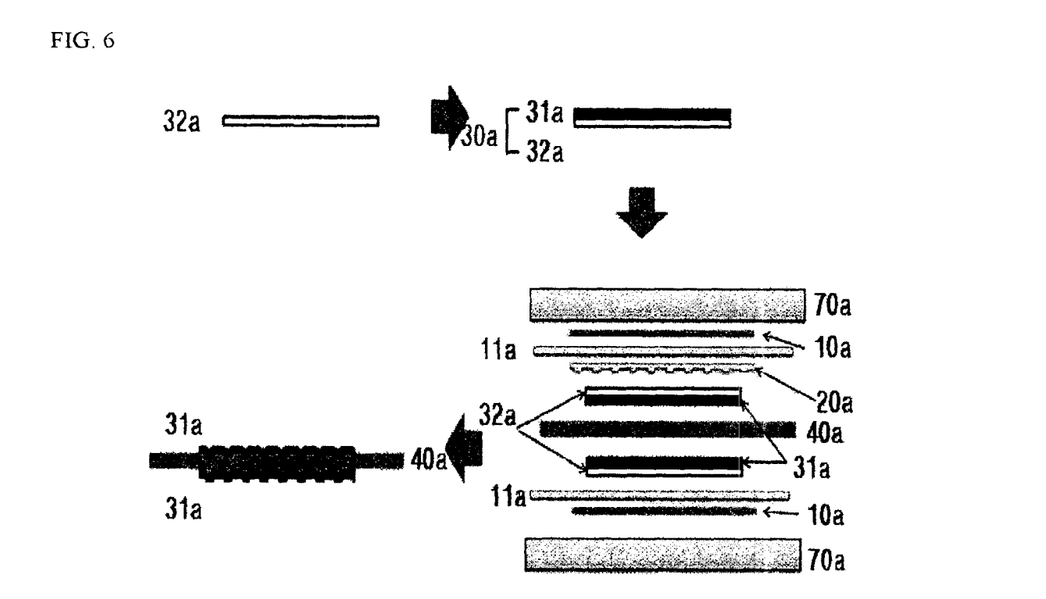
FIG. 6 is a view illustrating a process of heat-bonding step according to the present specification.

The flat substrate is used in order to prevent wrinkles generated by the use of a cloth material for the buffer substrate, the pattern paper, and the like, and the material thereof is not particularly limited, but may be a glass fiber film. FIG. 6 illustrates a process of heat-bonding steps according to the present specification.

The buffer substrate serves to prevent the membrane electrode assembly from being damaged by the pattern, and the material thereof is not particularly limited, but may be a cloth material such as polyester.

[Formation of Assembly]

The method for manufacturing a membrane electrode assembly according to the present specification may include forming an assembly by removing the pattern paper, the first release film, and the second release film from the heat-bonded laminate.

A method of removing the pattern paper, the first release film, and the second release film from the heat-bonded laminate is not particularly limited.

The assembly in which the pattern paper, the first release film, and the second release film are removed from the heat-bonded laminate is in a state where the first and second electrode catalyst layers are provided on both surfaces of the electrolyte membrane.

The method for manufacturing a membrane electrode assembly according to the present specification may further include further forming a gas diffusion layer on each of the first and second electrode catalyst layers of the manufactured assembly.

[Laminate]

The present specification provides a laminate including a first electrode film, a second electrode film, an electrolyte membrane, and pattern paper.

The description on the above-described method for manufacturing a membrane electrode assembly may be applied to the description on the laminate.

[First Electrode Film/Second Electrode Film]

The first electrode film may include a first release film and a first electrode catalyst layer provided on the first release film.

The second electrode film may include a second release film and a second electrode catalyst layer provided on the second release film.

One of the first and second electrode catalyst layers may be used as a catalyst layer of an anode or a catalyst layer of a cathode, and the other may be used as an electrode catalyst layer which is not selected as the catalyst layer of the anode and the catalyst layer of the cathode. In this case, the oxidation reaction of fuel occurs in the catalyst layer of the anode, and the reduction reaction of an oxidizing agent occurs in the catalyst layer of the cathode.

In an exemplary embodiment of the present specification, each of the first and second electrode catalyst layers may have a thickness of 3 μm or more and 30 μm or less. In this case, the thicknesses of the catalyst layer of the anode and the catalyst layer of the cathode may be the same as or different from each other.

[Electrolyte Membrane]

The electrolyte membrane may be provided between a first electrode film and a second electrode film.

Surfaces on which the first electrode catalyst layer and the second electrode catalyst layer are formed may be provided so as to each face the electrolyte membrane.

[Pattern Paper]

The pattern paper may be provided on a first release film. Specifically, the pattern paper may be provided on a surface opposite to a surface of the first release film on which the first electrode catalyst layer is formed.

The pattern paper may have non thermal conductivity. In the present specification, non-thermal conductivity may include a case where thermal conductivity is not present at all, or is slightly present. Specifically, non-thermal conductivity means that thermal conductivity is 2 W/m K or less, and more specifically, thermal conductivity is 0 to 0.5 W/m K.

[Membrane Electrode Assembly/Cell]

The present specification provides an electrochemical cell including: an anode; a cathode; and an electrolyte membrane provided between the anode and the cathode, in which the electrochemical cell includes a membrane electrode assembly manufactured by the method for manufacturing a membrane electrode assembly.

The cathode means an electrode which receives electrons and is reduced when the cell is discharged, and may be an anode (oxidation electrode) which is oxidized and releases electrons when the cell is charged. The anode means an electrode which is oxidized and releases electrons when the cell is discharged, and may be a cathode (reduction electrode) which receives electrons and is reduced when the cell is charged.

The electrochemical cell means a cell which uses chemical reactions, and is not particularly limited in type as long as the cell includes a membrane electrode assembly manufactured by the manufacturing method, but for example, the electrochemical cell may be a fuel cell, a metal secondary cell, or a flow cell.

The present specification provides an electrochemical cell module including an electrochemical cell as a unit cell.

The electrochemical cell module may be formed by inserting a bipolar plate between unit cells according to one exemplary embodiment of the present application to stack the cells.

The cell module may be specifically used as a power source for an electric vehicle, a hybrid electric vehicle, a plug-in hybrid electric vehicle, or a power storage device.

The present specification provides a membrane electrode assembly manufactured by the method for manufacturing a membrane electrode assembly.

The present specification provides a fuel cell including the membrane electrode assembly.

Figure 2:
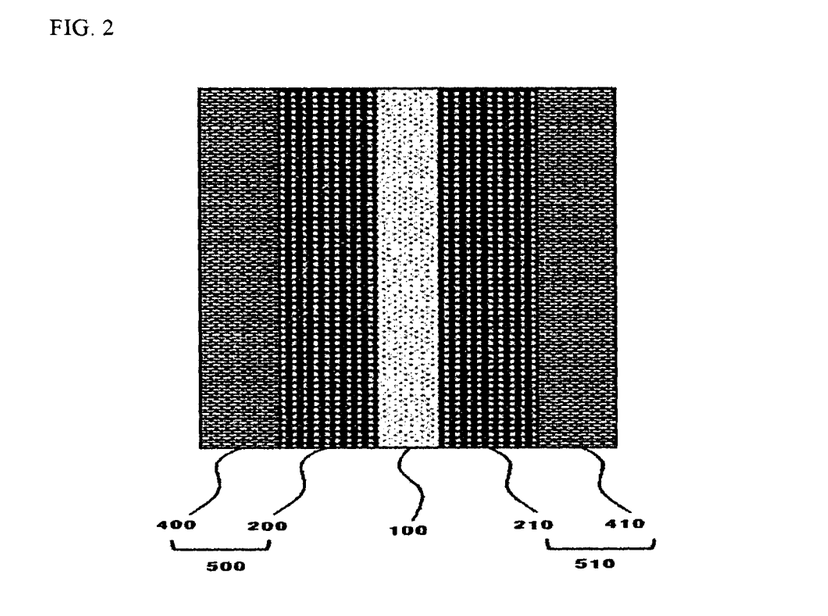
FIG. 2 is a view schematically illustrating a structure of a membrane electrode assembly for a fuel cell.

FIG. 2 schematically illustrates a structure of a membrane electrode assembly for a fuel cell, and the membrane electrode assembly for a fuel cell may include an electrolyte membrane 100, and a cathode 500 and an anode 510 facing each other with the electrolyte membrane 100 interposed therebetween. In the cathode, a cathode catalyst layer 200 and a cathode gas diffusion layer 400 may be provided sequentially from the electrolyte membrane 100, and in the anode, an anode catalyst layer 210 and an anode gas diffusion layer 410 may be provided sequentially from the electrolyte membrane 100.

Figure 3:
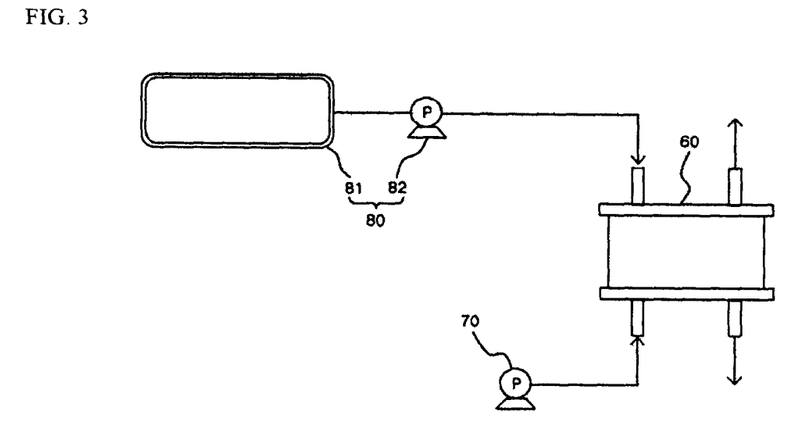
FIG. 3 is a view schematically illustrating an example of a fuel cell.

FIG. 3 schematically illustrates a structure of a fuel cell, and the fuel cell includes a stack 60, an oxidizing agent supplying part 70, and a fuel supplying part 80.

The stack 60 includes the above-described one membrane electrode assembly or two or more membrane electrode assemblies, and when two or more membrane electrode assemblies are included, the stack 60 includes a separator interposed therebetween. The separator serves to prevent the membrane electrode assemblies from being electrically connected to each other, and to transfer fuel and an oxidizing agent, which are supplied from the outside, to the membrane electrode assemblies.

The oxidizing agent supplying part 70 serves to supply an oxidizing agent to the stack 60. As the oxidizing agent, oxygen is representatively used, and oxygen or air may be used by being injected into the oxidizing agent supplying part 70.

The fuel supplying part 80 serves to supply fuel to the stack 60, and may be composed of a fuel tank 81 which stores fuel, and a pump 82 which supplies the stack 60 with fuel stored in the fuel tank 81. As the fuel, hydrogen or a hydrocarbon fuel in a gas or liquid state may be used. Examples of the hydrocarbon fuel may include methanol, ethanol, propanol, butanol, or natural gases.

MODE FOR INVENTION

Hereinafter, the present specification will be described in more detail through Examples. However, the following Examples are provided only for exemplifying the present specification, but are not intended to limit the present specification.

EXAMPLES

Preparation Example 1

Manufacture of Electrolyte Membrane 1

A reaction mixture was prepared in a nitrogen atmosphere by putting a hydroquinonesulfonic acid potassium salt, 4,4'-difluorobenzophenone, and 3,5-bis(4-fluorobenzoyl)phenyl(4-fluorophenyl)methanone into a 1L-round bottom flask equipped with a dean-stark trap and a condenser, and using potassium carbonate as a catalyst in a dimethyl sulfoxide (DMSO) and benzene solvent. Next, the reaction mixture was stirred again at a temperature of 150° C. or less to remove water in a reaction bath while benzene was flowing backward, the reaction temperature was increased to 200° C. or less, and the resulting product was subjected to polycondensation reaction. Next, after the temperature of the reactant was decreased to room temperature and the product was diluted by further adding DMSO thereto, the diluted product was poured into an excess of methanol, and a copolymer was separated from the solvent. Thereafter, a branched sulfonated multi-block copolymer in which a hydrophobic block and a hydrophilic block were alternately linked by a chemical bond was manufactured by drying a copolymer filtered and obtained by using water in a vacuum oven. In this case, the sulfonated multi-block copolymer manufactured was referred to as a first polymer. Electrolyte Membrane 1 was film-formed by applying the first polymer through bar coating in an applicator.

Preparation Example 2

Manufacture of Electrolyte Membrane 2

Electrolyte Membrane 2 was manufactured by impregnating a polyolefin-based porous support having a porosity of 60% to 70% in a solution including the above-described first polymer.

Example 1

An ionomer (product name: Nafion D2021), mono alcohol, and a Pt/C catalyst (product name: Tanaka 10V50E) were mixed/dispersed, an electrode catalyst layer was coated with the mixture by an inkjet coating method, and the electrode catalyst layer was dried, so that an electrode catalyst layer having a thickness of 10 μm was formed on a base material (PTFE) having a thickness of 200 μm, thereby manufacturing an electrode film.

Figure 7:
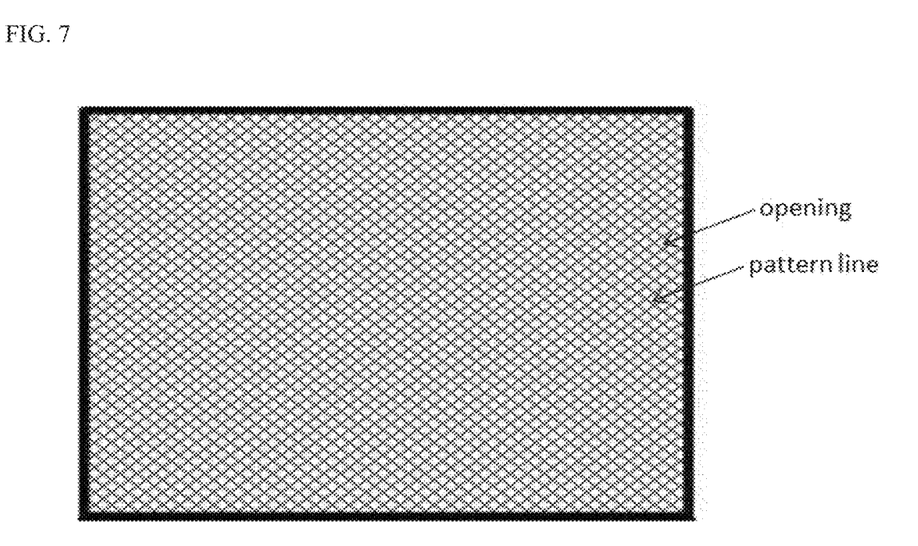
FIG. 7 is a view illustrating pattern paper used in Example 1 and Example 2.

After the electrode films were disposed on both surfaces of Electrolyte Membrane 1 manufactured in Preparation Example 1, a laminate was manufactured by additionally laminating the pattern paper in FIG. 7 on only the base material at one side of the electrode film. After a flat substrate (glass fiber) and a buffer substrate (polyester cloth) were laminated on both surfaces of the laminate, the substrates were disposed between two transfer substrates of a hot-press, and heat-bonded by applying a pressure of 2.7 ton thereto at 140° C.

Thereafter, an assembly in which the electrode catalyst layer was transferred to the electrolyte membrane was manufactured by removing the pattern paper and the base materials of the electrode films. The pattern paper has a thickness of 0.5 mm and is formed of a polyester material, and a pattern is woven on the base material and has a pattern form in FIG. 7. The pattern has a line thickness of approximately 200 μm and a line interval of 1 mm. In this case, thermal conductivity is 0.1 to 0.4 W/m K.

Example 2

An assembly was manufactured in the same manner as in Example 1, except that Electrolyte Membrane 2 manufactured in Preparation Example 2 was used instead of Electrolyte Membrane 1 as an electrolyte membrane.

Example 3

Figure 8:
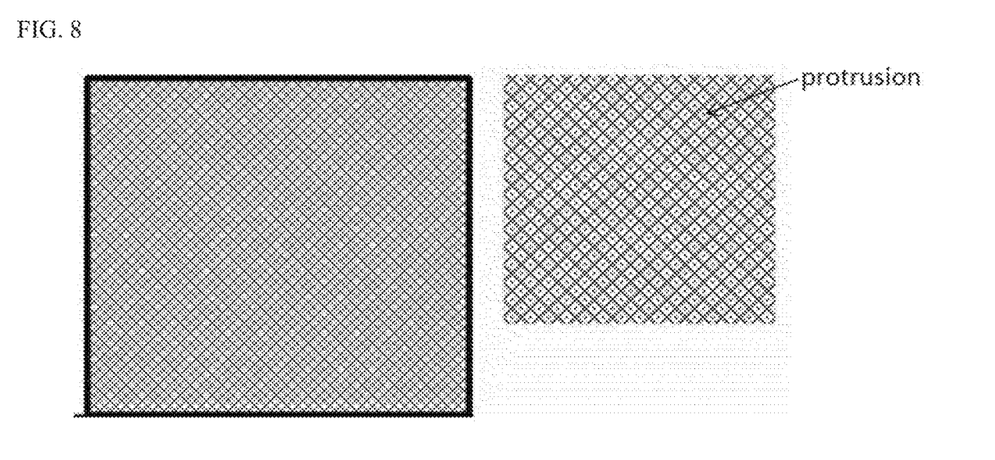
FIG. 8 is a view illustrating pattern paper used in Example 3.
Figure 9:
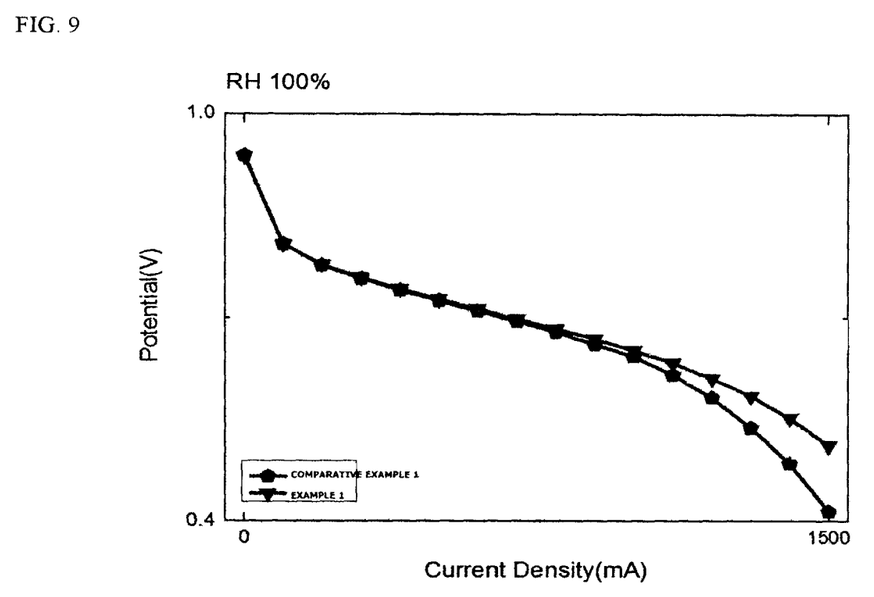
FIG. 9 is a view comparing the performances of the membrane electrode assemblies according to Example 1 and Comparative Example 1 under a condition of 100% relative humidity (RH).
Figure 10:
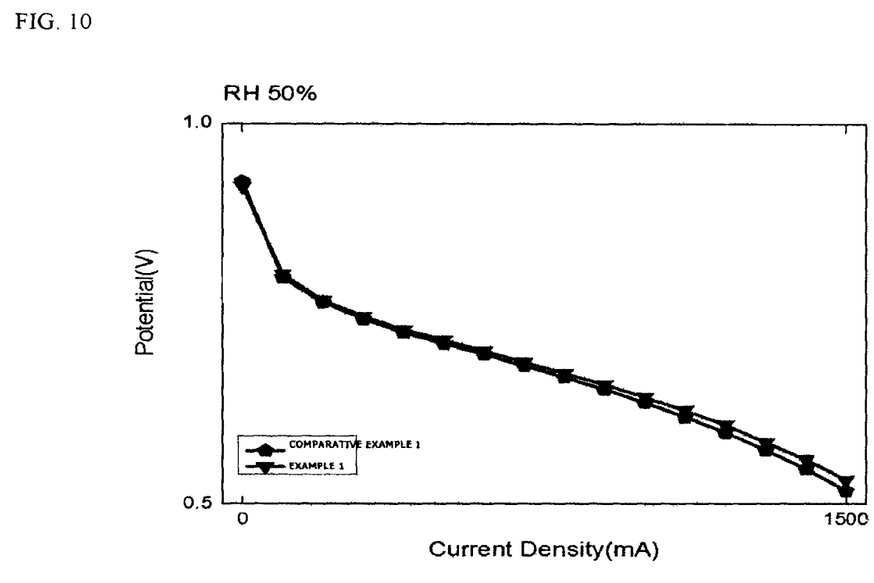
FIG. 10 is a view comparing the performances of the membrane electrode assemblies according to Example 1 and Comparative Example 1 under a condition of 50% relative humidity (RH).
Figure 11:
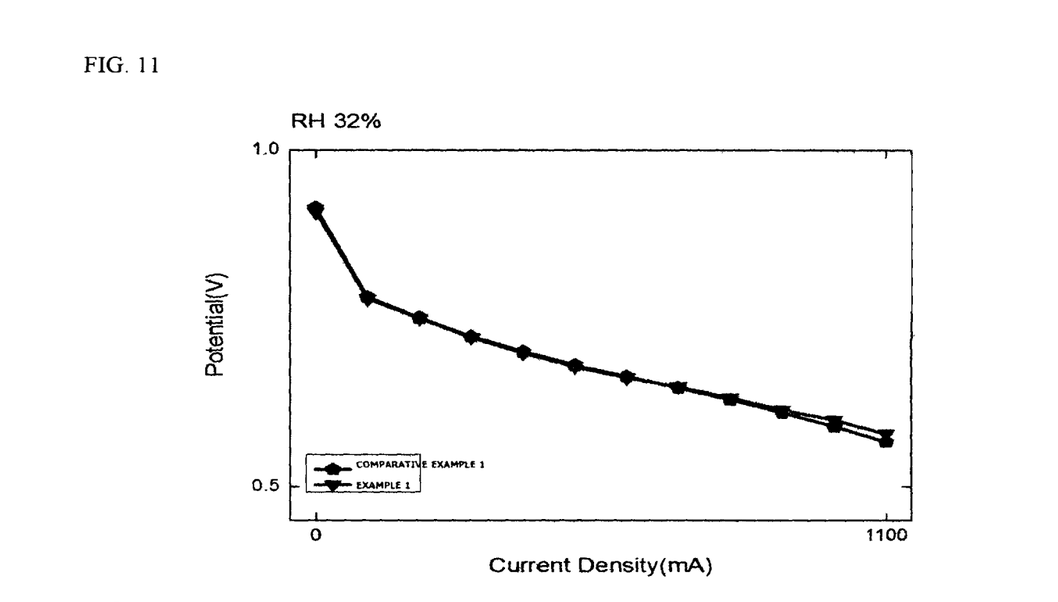
FIG. 11 is a view comparing the performances of the membrane electrode assemblies according to Example 1 and Comparative Example 1 under a condition of 32% relative humidity (RH).
Figure 12:
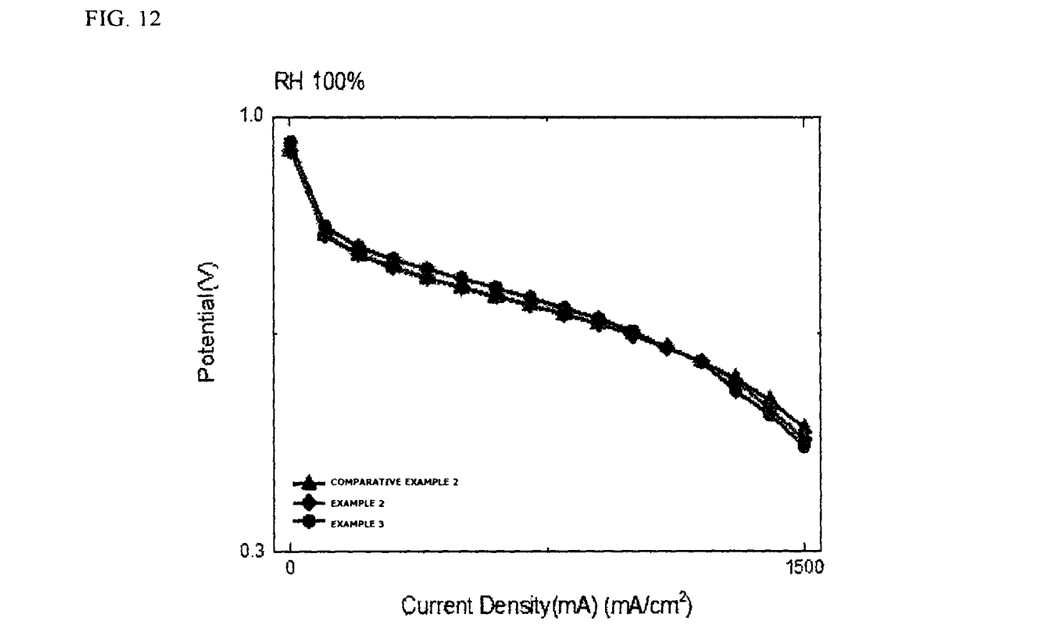
FIG. 12 is a view comparing the performances of the membrane electrode assemblies according to Examples 2 and 3 and Comparative Example 2 under a condition of 100% relative humidity (RH).
Figure 13:
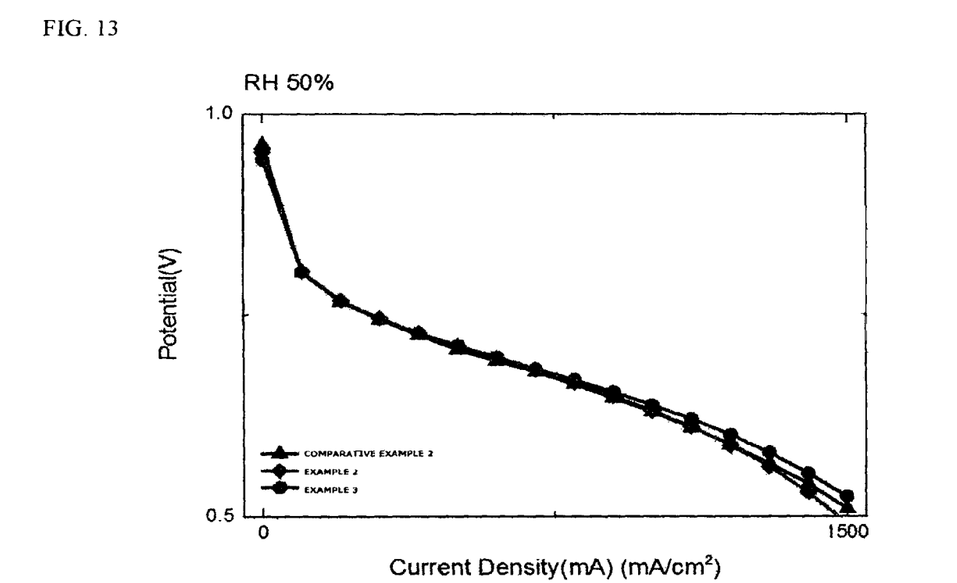
FIG. 13 is a view comparing the performances of the membrane electrode assemblies according to Examples 2 and 3 and Comparative Example 2 under a condition of 50% relative humidity (RH).
Figure 14:
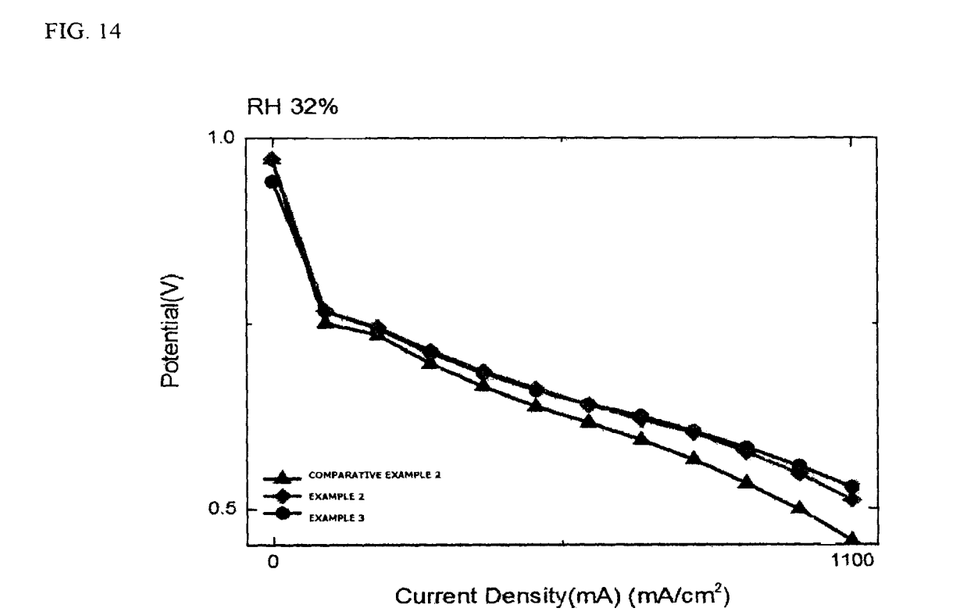
FIG. 14 is a view comparing the performances of the membrane electrode assemblies according to Examples 2 and 3 and Comparative Example 2 under a condition of 32% relative humidity (RH).

An assembly was manufactured in the same manner as in Example 2, except that the pattern paper in FIG. 8 was used instead of the pattern paper in FIG. 7.

The pattern paper has a thickness of 0.5 mm and is formed of a polyester material, and a pattern is woven on the base material and has a pattern form in FIG. 8. The pattern has a line thickness of approximately 200 μm and a line interval of 1 mm. In this case, thermal conductivity is 0.1 to 0.4 W/m K.

Comparative Example 1

An assembly was manufactured in the same manner as in Example 1, except that the substrates were heat-bonded without pattern paper.

Comparative Example 2

An assembly was manufactured in the same manner as in Example 2, except that the substrates were heat-bonded without pattern paper.

Comparative Example 3

After the electrode film was manufactured in Example 1, a pattern which is the same as that of the pattern paper in FIG. 7 was formed on the electrode catalyst layer by using a composition, which is the same as the composition from which the electrode catalyst layer was formed, by a stamp method (forming a pattern by putting a pattern and stamping the pattern like a stamp).

After an electrode films with the pattern formed were disposed on both surfaces of Electrolyte Membrane 2 manufactured in Preparation Example 2, the electrode film films were disposed between two transfer substrates of a hot-press, and heat-bonded by applying a pressure of 2.7 ton thereto at 140° C.

Thereafter, an assembly in which the electrode catalyst layer was transferred to the electrolyte membrane was manufactured by removing the base materials of the electrode films.

Comparative Example 4

A laminate in which the electrode films manufactured in Example 1 were disposed on both surfaces of Electrolyte Membrane 1 manufactured in Preparation Example 1 was manufactured. An aluminum foil having the same pattern as that of the pattern in FIG. 7 was attached onto two transfer substrates of a hot-press, and then the laminate was disposed between the transfer substrates and then heat-bonded by applying a pressure of 2.7 ton thereto at 140° C.

Thereafter, an assembly in which the electrode catalyst layer was transferred to the electrolyte membrane was manufactured by removing the base materials of the electrode films.

Experimental Example 1

Measurement of Current Density

The results of Comparative Examples 1 and 2 and Examples 1 to 3 are illustrated in FIGS. 9 to 14 according to the relative humidity, and particularly, the results of comparing current densities at 0.6 V based on Comparative Example 1 are shown in the following Table 1.

TABLE 1

| Sample | Comparison of relative current densities (ratio) @ 0.6 V | | |
|---|---|---|---|
| | RH 100% | RH 50% | RH 32% |
| Comparative Example 1 | 1 | 1 | 1 |
| Comparative Example 2 | 1 | 1 | 1 |
| Example 1 | 1.08 | 1.04 | 1.04 |
| Example 2 | 1 | 1 | 1.20 |
| Example 3 | 1 | 1.05 | 1.25 |

Through FIGS. 9 to 14 and Table 1, it can be seen that the membrane electrode assemblies using the pattern have similar performances at the existing RH 100% or RH 50%, but the performance is improved in a low humidity region. This means that even when moisture is present in a small amount in the membrane electrode assembly, ions efficiently move through an increase in contact area and a decrease in contact resistance during the transfer, and as a result, the performance is improved.

Figure 16:
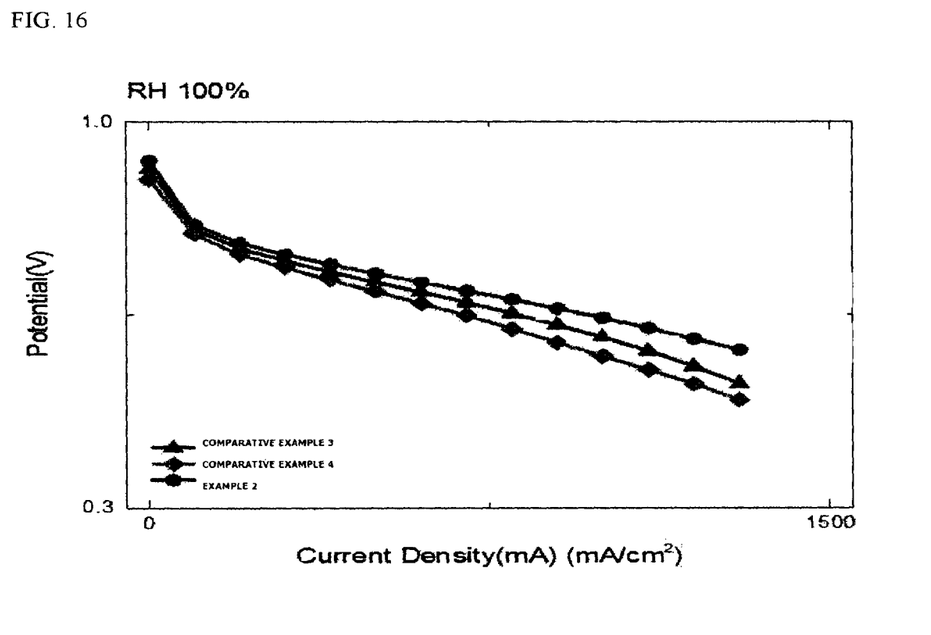
FIG. 16 is a view comparing the performances of the membrane electrode assemblies according to Example 2 and Comparative Examples 3 and 4 under a condition of 100% relative humidity (RH).
Figure 17:
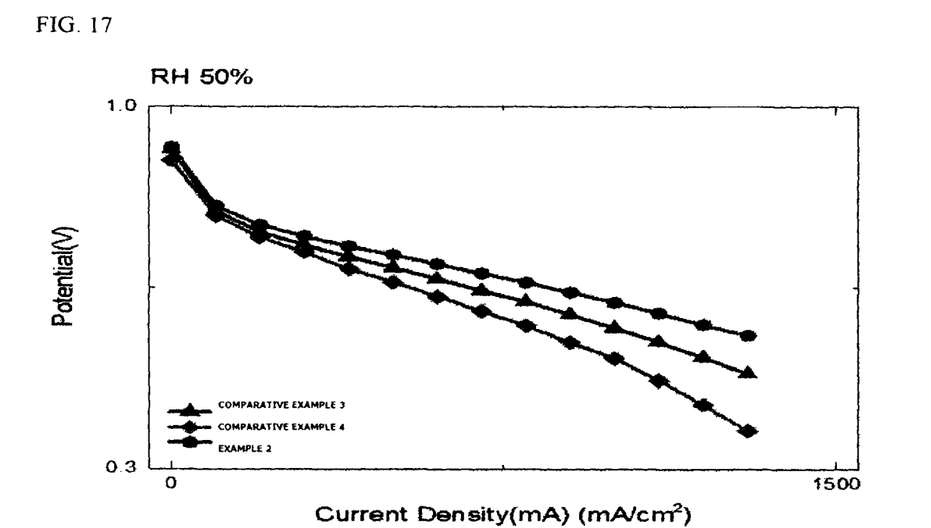
FIG. 17 is a view comparing the performances of the membrane electrode assemblies according to Example 2 and Comparative Examples 3 and 4 under a condition of 50% relative humidity (RH).
Figure 18:
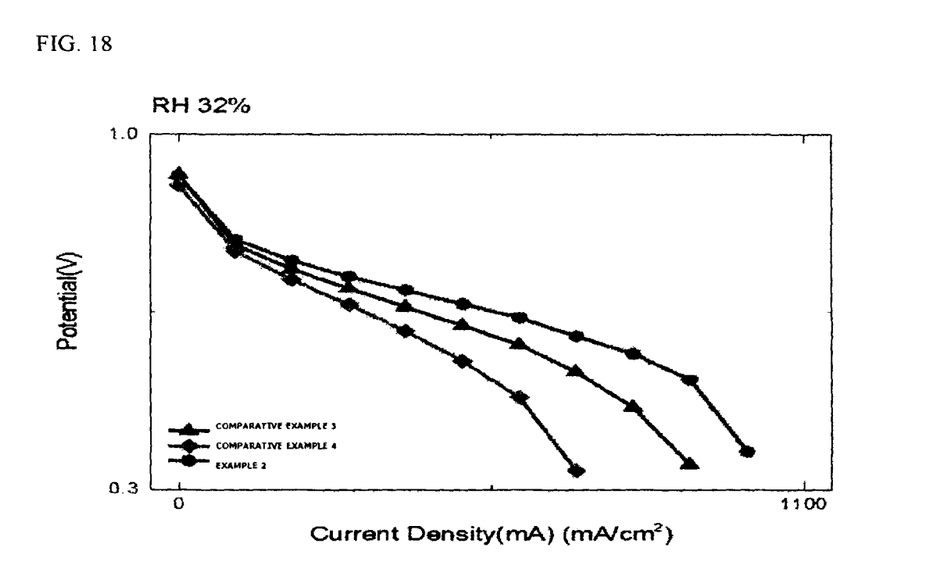
FIG. 18 is a view comparing the performances of the membrane electrode assemblies according to Example 2 and Comparative Examples 3 and 4 under a condition of 32% relative humidity (RH).

The results of Comparative Examples 3 and 4 and Example 2 are illustrated in FIGS. 16 to 18 according to the relative humidity, and particularly, the results of comparing current densities at 0.6 V based on Comparative Example 4 are shown in the following Table 2.

TABLE 2

| Sample | Comparison of relative current densities (ratio) @ 0.6 V | | |
|---|---|---|---|
| | RH 100% | RH 50% | RH 32% |
| Comparative Example 3 | 1.16 | 1.24 | 1.33 |
| Comparative Example 4 | 1 | 1 | 1 |
| Example 2 | 1.37 | 1.56 | 1.68 |

Through FIGS. 16 to 18 and Table 2, it can be seen that the performance in Comparative Example 3 in which the pattern is put into the electrode is higher than that in Comparative Example 4 in which the aluminum foil is used, but the performance in Example 2 is improved by 37% to 68% as compared to that in Comparative Example 4, and particularly, it can be confirmed that the lower the humidity is, the larger the improvement in performance is. Through this, it can be seen that the performance of the membrane electrode assembly using the pattern paper is improved more than the performance by the other methods. The improvement in performance is a result that may be obtained through an increase in contact area and a decrease in contact resistance due to the pattern during the transfer.

Experimental Example 2

Relative Humidity Circulation Experiment (RH Cycle Test)

In this case, an RH cycle measures the durability of the membrane electrode assembly (MEA) in a fuel cell state, and the durability was measured by injecting hydrogen and nitrogen into an anode at a flow rate of 0.95 standard liter per minute (slm) under a condition of 80° C., injecting nitrogen into a cathode at a flow rate of 1.0 slm, and switching humidification and non-humidification at an interval of 2 minutes.

Through the RH cycle of the membrane electrode assembly, an excellent mechanical durability may be confirmed, and a high RH cycle means that the durability of the membrane electrode assembly is high. In this case, the RH cycle means the number of cycles up to the cycle in which damage which is too strong for the membrane electrode assembly to be used has occurred.

In order to measure whether the membrane electrode assembly is damaged during the RH cycle, a linear sweep voltammetry (LSV) is used, and the linear sweep voltammetry measures the crossover of hydrogen at 0.1 to 0.4 V (2 mV/s) by injecting hydrogen into an anode at a flow rate of 0.2 slm and injecting nitrogen into a cathode at a flow rate of 0.2 slm.

When the crossover value of hydrogen is increased during the RH cycle, it can be seen that the membrane electrode assembly is damaged, and according to the degree to which the crossover value of hydrogen is increased, the degree to which the membrane electrode assembly is damaged may be determined.

Figure 15:
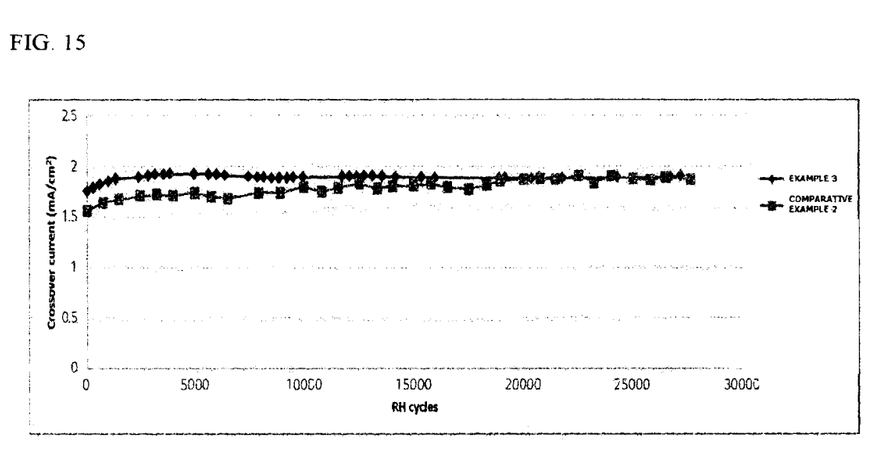
FIG. 15 is a view illustrating that the durability of membrane electrode assemblies in a fuel cell state is measured through an RH cycle test.

The results are illustrated in FIG. 15.

Through FIG. 15, it can be seen that the membrane electrode assembly is a membrane electrode assembly having durability satisfying the DOE criteria (the criteria of the US Department of Energy, crossover value of 2 mA/cm$^2$ or less at 20,000 cycles), and considering that the results of the membrane electrode assembly in Example 3 and the membrane electrode assembly in Comparative Example 2 in which the transfer was performed by using pattern paper are similar to each other, it could be confirmed that the durability was not affected because the membrane electrode assembly was scarcely damaged by the pattern.

What is claimed is:

1. A method for manufacturing a membrane electrode assembly, the method comprising:
manufacturing a first electrode film by forming a first electrode catalyst layer on a first surface of a first release film;
manufacturing a second electrode film by forming a second electrode catalyst layer on a second release film;
forming a laminate by sequentially stacking the second electrode film,
an electrolyte membrane, the first electrode film, and a pattern paper, wherein the first electrode catalyst layer extends between the electrolyte membrane and the first release film, and the second electrode catalyst layer extends between the electrolyte membrane and the second release film, and wherein the pattern paper extends on a second surface of the first release film, and the second surface of the first release film is opposite to the first surface of the first release film;
placing the laminate between two transfer substrates having a thermal conductivity and performing a heat-bonding process on the laminate between the two transfer substrates; and then
removing the pattern paper, the first release film, and the second release film from the laminate,
wherein the pattern paper is a cloth with a woven pattern.

2. The method of claim 1, wherein the pattern paper has a thickness of 10 μm or more and 1 mm or less.

3. The method of claim 1, wherein the woven pattern is on the cloth.

4. The method of claim 3, wherein an interval of the woven pattern is 50 μm or more and 3 mm or less.

5. The method of claim 3, wherein the woven pattern is a mesh pattern.

6. The method of claim 3, wherein the woven pattern comprises an opening and a pattern line surrounding the opening.

7. The method of claim 6, wherein the woven pattern further comprises a protrusion in the opening.

8. The method of claim 1, wherein the pattern paper comprises polyester and has a thickness of 0.5 mm.

9. The method of claim 1, wherein the pattern paper has a thermal conductivity of from 0.1 to 0.4 W/m K.

10. The method of claim 1, wherein the pattern paper comprises a base material and a plurality of lines that are on the base material and have an interval of 1 mm.

11. A method for manufacturing a membrane electrode assembly, the method comprising:
manufacturing a first electrode film by forming a first electrode catalyst layer on a first surface of a first release film;
manufacturing a second electrode film by forming a second electrode catalyst layer on a second release film;
forming a laminate by sequentially stacking the second electrode film,
an electrolyte membrane, the first electrode film, and a pattern paper, wherein the first electrode catalyst layer extends between the electrolyte membrane and the first release film, and the second electrode catalyst layer extends between the electrolyte membrane and the second release film, and wherein the pattern paper extends on a second surface of the first release film, and the second surface of the first release film is opposite to the first surface of the first release film;

placing the laminate between two transfer substrates having a thermal conductivity and performing a heat-bonding process on the laminate between the two transfer substrates; and then removing the pattern paper, the first release film, and the second release film from the laminate, wherein the pattern paper comprises polyester and has a thickness of 0.5 mm.

12. The method of claim 11, wherein the pattern paper comprises a base material comprising polyester and a pattern on the base material.

13. The method of claim 12, wherein an interval of the pattern is 50 μm or more and 3 mm or less.

14. The method of claim 12, wherein the pattern comprises an opening and a pattern line surrounding the opening.

15. The method of claim 14, wherein the pattern further comprises a protrusion in the opening.

16. A method for manufacturing a membrane electrode assembly, the method comprising:

manufacturing a first electrode film by forming a first electrode catalyst layer on a first surface of a first release film;

manufacturing a second electrode film by forming a second electrode catalyst layer on a second release film;

forming a laminate by sequentially stacking the second electrode film, an electrolyte membrane, the first electrode film, and a pattern paper, wherein the first electrode catalyst layer extends between the electrolyte membrane and the first release film, and the second electrode catalyst layer extends between the electrolyte membrane and the second release film, and wherein the pattern paper extends on a second surface of the first release film, and the second surface of the first release film is opposite to the first surface of the first release film;

placing the laminate between two transfer substrates having a thermal conductivity and performing a heat-bonding process on the laminate between the two transfer substrates; and then removing the pattern paper, the first release film, and the second release film from the laminate, wherein the pattern paper comprises a base material and a plurality of lines that are on the base material and have an interval of 1 mm.

17. The method of claim 16, wherein the pattern paper has a thickness of 10 μm or more and 1 mm or less.

18. The method of claim 16, wherein the base material is a cloth, a non-woven fabric, a plastic film, or a paper.

19. The method of claim 16, wherein one of the plurality of lines defines an opening.

20. The method of claim 19, wherein the pattern paper further comprises a protrusion that is on the base material and in the opening.

* * * * *